US011720576B1

(12) United States Patent
Alyea et al.

(10) Patent No.: US 11,720,576 B1
(45) Date of Patent: *Aug. 8, 2023

(54) LEVERAGING HISTORICAL DATA TO IMPROVE THE RELEVANCY OF SEARCH RESULTS

(71) Applicant: Roblox Corporation, San Mateo, CA (US)

(72) Inventors: David Alyea, San Mateo, CA (US); Aswath Manoharan, Sunnyvale, CA (US); Nikolaus Sonntag, Foster City, CA (US); Shailendra Rathore, San Ramon, CA (US)

(73) Assignee: Roblox Corporation, San Mateo, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 17/107,270

(22) Filed: Nov. 30, 2020

Related U.S. Application Data

(63) Continuation of application No. 15/686,590, filed on Aug. 25, 2017, now Pat. No. 10,853,375.

(51) Int. Cl.
*G06F 16/2457* (2019.01)
*G06F 16/9535* (2019.01)
*A63F 13/79* (2014.01)

(52) U.S. Cl.
CPC ........ *G06F 16/24578* (2019.01); *A63F 13/79* (2014.09); *G06F 16/9535* (2019.01)

(58) Field of Classification Search
CPC .......... G06F 16/24578; G06F 16/9535; A63F 13/79; A63F 13/55; A63F 13/795
See application file for complete search history.

(56) References Cited

U.S. PATENT DOCUMENTS

| | | | |
|---|---|---|---|
| 7,346,839 | B2 | 3/2008 | Acharya et al. |
| 9,037,581 | B1 | 5/2015 | Zamir et al. |
| 9,152,714 | B1 | 10/2015 | Dijk |
| 9,713,444 | B2 | 7/2017 | Severson |
| 2015/0161256 | A1 | 6/2015 | Jeh |
| 2015/0243123 | A1* | 8/2015 | Borissov ............... G07F 17/326 463/31 |
| 2015/0269163 | A1 | 9/2015 | Sun |
| 2015/0278357 | A1 | 10/2015 | Wang |
| 2016/0246791 | A1 | 8/2016 | Long et al. |
| 2017/0031916 | A1 | 2/2017 | Sayyadi-Harikandehei et al. |
| 2017/0232335 | A1* | 8/2017 | Williams ................ A63F 13/58 463/31 |
| 2017/0300571 | A1* | 10/2017 | Chiarandini ............ G06F 16/78 |
| 2018/0341997 | A1 | 11/2018 | Siddiqui et al. |

\* cited by examiner

*Primary Examiner* — Robert W Beausoliel, Jr.
*Assistant Examiner* — Mohammad S Bhuyan
(74) *Attorney, Agent, or Firm* — Lowenstein Sandler LLP

(57) ABSTRACT

A method includes identifying a search term and obtaining historical data indicative of a number of times a game was selected from search results corresponding to search queries using the search term and indicative of a number of times the selected game was played by one or more users for at least a threshold amount of time. The method further includes generating a score based on the historical data. The score is associated with the search term and the selected game.

20 Claims, 7 Drawing Sheets

LEVERAGING HISTORICAL DATA TO IMPROVE THE RELEVANCY OF SEARCH RESULTS

RELATED APPLICATION

This application is a continuation application of U.S. patent application Ser. No. 15/686,590, filed Aug. 25, 2017, the entire contents of which are hereby incorporated by reference herein.

TECHNICAL FIELD

This disclosure relates to the field of information retrieval systems and, in particular, to generating search results based, at least in part, on historical data associated with games and game objects of a collaboration platform.

BACKGROUND

Collaboration platforms allow users to connect to and share information with each other via the Internet. Users of a collaboration platform, such as a gaming platform, may participate in multi-user gaming environments, design custom gaming environments, decorate avatars, or exchange virtual items with other users, and so forth.

DESCRIPTION OF DRAWINGS

Various implementations of the present disclosure will be understood more fully from the detailed description given below and from the accompanying drawings of various implementations of the disclosure.

DETAILED DESCRIPTION

Figure 1:
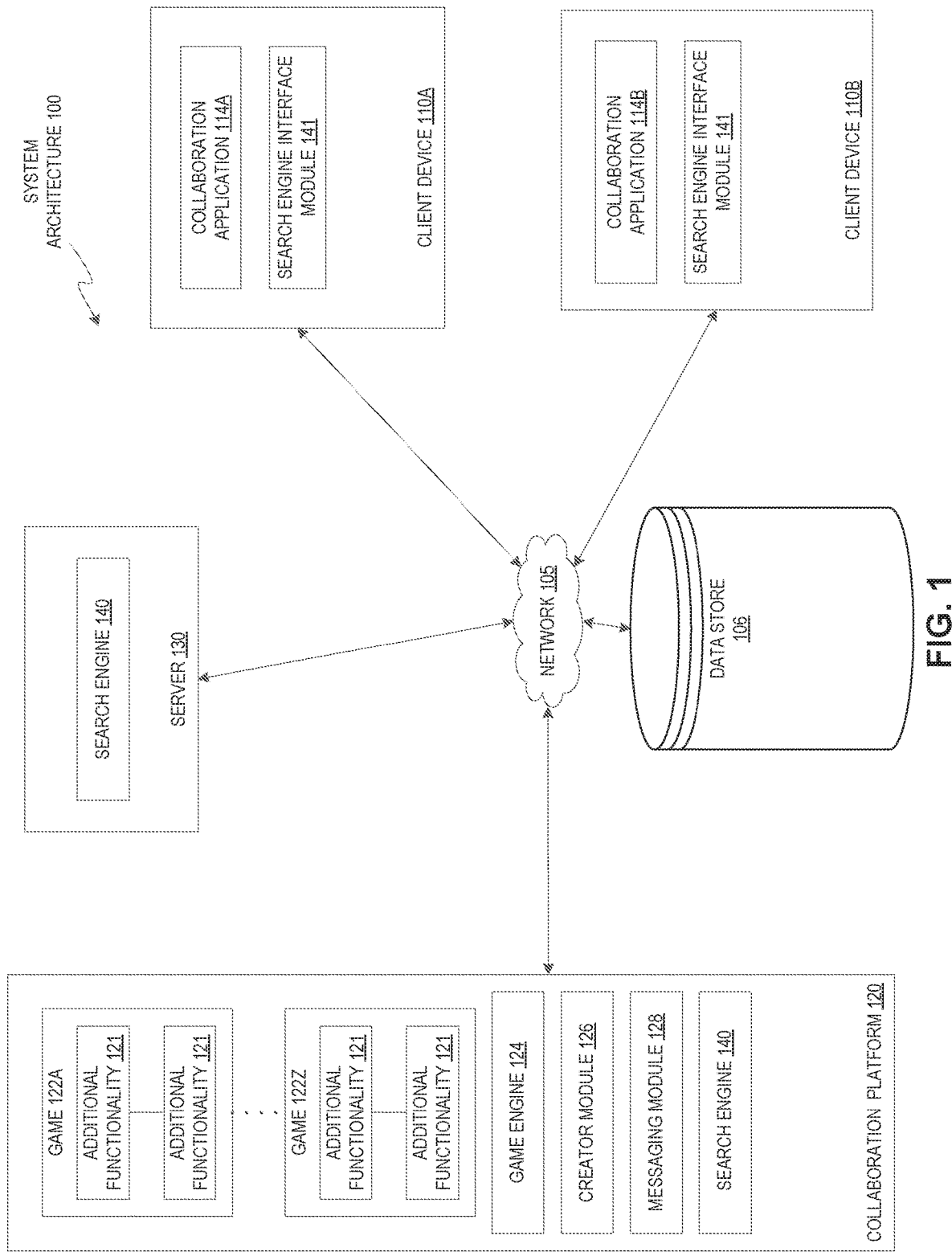
FIG. 1 illustrates an example system architecture, in accordance with implementations of the disclosure.

Collaboration platforms, such as gaming platforms, offer a variety of ways for users to interact with one another. For example, users of a gaming platform may work together towards a common goal, share various gaming items, send electronic messages to one another, and so forth. Users of a collaboration platform may play games (e.g., playing users) with characters or create games (e.g., creating users) with developmental tools via the collaboration platform. In a collaboration platform, users may search for content items, such as games or game objects, using a search engine. For example, in a gaming platform a playing user may search for a game using a search term and a creating user may search for a game object using a different search term. In some platforms, the search results provided to users may be irrelevant to the desired information. Responsive to providing irrelevant search results, users may become frustrated with the platform, spend less time on the platform, or leave the platform all together. In other platforms, the specific historical data a search engine uses may not be appropriate or benefit the search for specific types of information. In still other platforms, search engines using historical data may not provide search results with relevant information. For example, the search results may not include relevant content with little or no historical data.

Aspects of the present disclosure address the above-mentioned and other challenges by scoring search terms based on historical data. In some implementations, the historical data includes first data indicative of a number of times a content item (e.g., game or game object) has been returned in search results responsive to search queries using the search term, and second data indicative of a number of times the content item was selected from the search results and interacted with by users for a threshold amount of time.

In implementations, a score may be associated with a search term and a particular content item in a search index. A particular search term may be associated with multiple content items, and each instance of the particular search term may have a different score. In some implementations, responsive to a subsequent search query, the search term of the search query may be used to identify multiple scores that are associated with multiple content items. In some implementations, scores associated with the search term may be used to determine relevant content items to include in the search results. In some implementations, content items with no or little historical data may be merged into search results so that such content items are allowed to surface.

Allowing the generation of scores for search terms based on historical data and providing search results based on the scores, as disclosed herein, is advantageous because it enables further immersion of users into the collaboration platform, which improves an overall user experience with the collaboration platform, and increases the content consumed (e.g., time using the collaboration platform) by users of the collaboration platform. Further, aspects of the present disclosure result in increased efficiency of the collaboration platform at least because users may more efficiently search for relevant content items. In addition, aspects of the present disclosure result in significant reduction of storage resources and significant reduction of computational (processing) resources at least because providing relevant search results is faster and more efficient than performing multiple searches that provide irrelevant search results, for example.

It may be noted that a collaboration platform described as a gaming platform herein is provided for purposes of illustration, rather than limitation. A collaboration platform may be one or more of numerous platforms, such as a social networking platform, purchasing platform, a messaging platform, creation platform, and so forth.

FIG. 1 illustrates an example system architecture 100, in accordance with one implementation of the disclosure. The system architecture 100 (also referred to as "system" herein) includes client devices 110A and 110B, a network 105, a data store 106, a collaboration platform 120, and a server 130.

In one implementation, network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, and/or a combination thereof.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

In implementations, the server 130 may be one or more computing devices (e.g., a rackmount server, a server computer, etc.). In implementations, the server 130 may be included in the collaboration platform 120, be an independent system or be part of another system or platform. The server 130 may include search engine 140.

In some implementations, the collaboration platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to collaboration platform 120. The collaboration platform 120 may also include a website (e.g., a webpage) or application back-end software that may be used to provide a user with access to content provided by collaboration platform 120. For example, users may access collaboration platform 120 using collaboration application 114 on client devices 110.

In implementations, collaboration platform 120 may be a type of social network providing connections between users. In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline, such as a game 122 of the collaboration platform 120.

In one implementation, collaboration platform 120 may be a gaming platform, such as an online gaming platform. For example, the gaming platform may provide single-player or multi-player games to a community of users that may access or interact with the games 122A-122Z using client devices 110. In implementations, games 122 (also referred to as "video game," "online game," or "virtual game" herein) may be two-dimensional (2D) games, three-dimensional (3D) games, virtual reality (VR) games, or augmented reality (AR) games, for example. In implementations, a game 122 may be played in real-time with other user of the game 122. A game 122 can include an electronic file that can be executed or loaded using software, firmware or hardware configured to present the game content (e.g., digital media item) to an entity. In some implementations, collaboration platform 120 hosts games 122 and allows users to interact with the games 122 using collaboration application 114 of client devices 110. Users of collaboration platform 120 may play, create, interact with, or build games 122, or create and build contents of games 122. For example, users may create characters, decoration for the characters, one or more virtual environments for an interactive game, or build structures used in a game 122, for example. In implementations, users may buy, sell, or trade game objects, such as in-platform currency (e.g., virtual currency), with other users of the collaboration platform 120. In implementations, collaboration platform may transmit game content to collaboration applications 114. Game content (also referred to as "content" or "content item" herein) may refer to any data or software instructions (e.g., game objects, game, user information, video, images, commands, media item, etc.) associated with collaboration platform 120 or collaboration applications 114.

It may be noted that collaboration platform 120 hosting games 122, is provided for purposes of illustration, rather than limitation. In some implementations, collaboration platform 120 may host one or more media items. Media items can include, but are not limited to, digital video, digital movies, digital photos, digital music, audio content, melodies, website content, social media updates, electronic books (ebooks), electronic magazines, digital newspapers, digital audio books, electronic journals, web blogs, real simple syndication (RSS) feeds, electronic comic books, software applications, etc. In implementations, a media item may be an electronic file that can be executed or loaded using software, firmware or hardware configured to present the digital media item to an entity.

In one implementation, collaboration platform 120 may consolidate the game content from the client devices 110 and transmit the consolidated game content (e.g., gaming video, rendering commands, user input, graphics library commands, etc.) to each of the client devices 110 to display interactions of the multiple users in a multi-player gaming environment. In another implementation, collaboration platform 120 may transmit the game content from one or more client devices 110 to another client device for the other client device to consolidate and display the game content. In another implementation, the collaboration platform 120 may receive the game content (e.g., first user transmitting user input via client device 110A and second user transmitting user input via client device 110B), generate game results (e.g., first user beats second user), and transmit the game results to the client devices 110.

In some implementations, a game 122 may be associated with a particular user or particular group of users (e.g., a private game), or made widely available to users of the collaboration platform 120 (e.g., a public game). In implementations, where collaboration platform 120 associates one or more games 122 with a specific user or group of users, collaboration platform 120 may associated the specific user(s) with a game 122 using user account information (e.g., a user account identifier such as username and password).

In some implementations, collaboration platform 120 may include a game engine 124. In implementations, game engine 124 may be used for the development or execution of games 122. For example, game engine 124 may include a rendering engine ("renderer") for 2D, 3D, VR, or AR graphics, a physics engine or collision detection (and collision response), sound, scripting, animation, artificial intelligence, networking, streaming, memory management, threading, localization support, scene graph, or video support for cinematics, among other features.

In implementations, collaboration platform 120 may include a creator module 126. In implementations, creator module 126 may allow users to become creators to design or create environments in an existing game 122 or create new games or create new game objects within games or environments. In some implementations, a game 122 may have a common set of rules or common goal, and the environments of a game 122 share the common set of rules or common goal. In implementations, different games may have different rules or goals from one another. In some implementations, games may have one or more environments (also referred to as "gaming environments" or "virtual environment" herein) where multiple environments may be linked. For example, a user may build a virtual environment that is linked to another virtual environment created by another user. A character of the virtual game may cross the virtual border to enter the adjacent virtual environment. In implementations, game objects (also referred to as "items" herein) may refer to objects that are used, created, shared or otherwise depicted in games 122 of the collaboration platform 120. For example, game objects may include a part, model, character, tools, clothing, buildings, vehicles, currency, flora, fauna, components of the aforementioned (e.g., windows of a building), and so forth.

In implementations, creator module 126 may allow a user to create, modify, or customize characters. In implementations, characters (or game objects generally) are constructed from components, one or more of which may be selected by the user, that automatically join together to aid the user in editing. One or more characters (also referred to as an "avatar" or "model" herein) may be associated with a user (also referred to as a "playing user" herein) where the user may control the character to facilitate a user's interaction with the game 122. In implementations, a character may include components such as body parts (e.g., hair, arms, legs, etc.) and accessories (e.g., t-shirt, glasses, decorative images, tools, etc.). In implementations, body parts of characters that are customizable include head type, body part types (arms, legs, torso, and hands), face types, hair types, skin types, among others. In implementations, the accessories that are customizable include clothing (e.g., shirts, pants, hats, shoes, glasses, etc.), weapons, or other tools. In implementations, the user may also control the scale (e.g., height, width, or depth) of a character or the scale of components of a character. In implementations, the user may control the proportions of a character (e.g., blocky, anatomical, etc.).

In some implementations, a component, such as a body part, may be a primitive geometrical shape such as a block, a cylinder, a sphere, etc., or some other primitive shape such as a wedge, a torus, a tube, a channel, etc. In implementations, creator module 126 may publish a user's character for other users of collaboration platform 120 to view or select. It some implementations, creating, modifying, or customizing characters, other game objects, games 122, or game environments may be performed by a user using a user interface (e.g., developer interface) and with or without scripting (or without an application programming interface (API)). It may be noted that for purposes of illustration, rather than limitation, characters are described as having a humanoid form. In may further be noted that characters may have any form such as a vehicle, animal, inanimate object, or other creative form.

In implementations, collaboration platform 120 may store characters created by users in data store 106. In implementations, the collaboration platform 120 maintains a character catalog and game catalog that may be presented to users via collaboration application 114. A user may select a game 122 from the game catalog to play. In implementations, the game catalog includes images of games stored on collaboration platform 120. In addition, a user may select a character (created by the playing user or other user) from the character catalog to participate in the chosen game. The character catalog includes images of characters stored on the collaboration platform 120. In implementations, one or more of the characters in the character catalog may have been created or customized by the user. In implementations, the chosen character may have character settings defining one or more of the components of the character.

In implementations, a user's character includes a configuration of components, where the configuration and appearance of components and more generally the appearance of the character may be defined by character settings. In implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by collaboration platform 120.

In implementations, creator module 126 includes a unique personal build and publishing service for creating and administering games 122 and gaming environments on the Internet that allows users (also referred to as "creating users," "creators," "owners," or "owning users" herein) to create, own, or administrate games 122 and gaming environments using cloud-mediated computational resources, for example. In implementations, creator module 126 may use a user interface (also referred a "developer interface" herein) via collaboration application 114 to allow users access the functionality of creator module 126. In implementations, the developer interface may be part of collaboration application 114. For example, a developer interface of collaboration application 114 may allow a user access to a library of game objects that may be selected by the user to build a game environment or place game objects within a game 122 or environment. The user may publish their selected game objects via the developer interface so that the game objects are available to playing users of the game 122 or environment.

In implementations, collaboration platform 120 executing creator module 126 includes a user-interfacing website or application (e.g., collaboration application 114) where users may access online computational resources hosted by collaboration platform 120 for the purposes of building, administrating, editing, and interacting with personally owned games 122 or gaming environments. In implementations, creator module 126 includes tools available to users for creating and instantiating three-dimensional virtual games or environments. In implementations, creator module 126 is available to users that wish to create and administer their own private virtual game 122. In implementations, a user may access creator module 126 using collaboration application 114.

In implementations, creator module 126 may provide control of created games 122 and environments to owning users who may set administrative policy regarding who will be allowed to interact with the created game 122 or environment and who has the capability of modifying, editing, or interacting with the game 122 or environment. Users with administrative control may also be referred to as owning users herein, unless otherwise specified. In some implementations, administrative rules can be granular to the point of specifying various levels of interaction, modification, or editing capabilities for certain individuals who might be recruited or otherwise desire to interact with the game 122 or gaming environment. For example, individuals may be recruited from friends in collaboration platform 120 or friends from social networks or in other collaborative or group associated online venues. In implementations, creator module 126 has administrative tools for setting such policies including or in addition to general rules for interaction within the game 122 or gaming environment.

In implementations, collaboration platform 120 may include search engine 140. For purposes of illustration, rather than limitation, search engine 140 is described as allowing users to search for content items of or related to collaboration platform 120. In other implementations, aspects of the present disclosure may be used to search information generally, such as information of the World Wide Web (WWW) or other information resource, for example. In some implementations, a user may request information using a search query. A search query may refer to a request or query for information where a user supplies a search term to a search engine 140 to satisfy the request of information. A search term may refer to an input (e.g., a word, a character, a combination of words or characters, etc.) entered as part of a search query and used by the search engine 140 to provide relevant information (e.g., search results). The search engine may retrieve and return search results to the user that may include relevant information associated with the search term.

For example, in searching for a game 122 a user may enter the search term "Tycoon" into a user interface, such as search engine interface module 141 of client device 110. The search term may be sent via network 105 to search engine 140 of collaboration platform 120. The search engine 140 may use a search index to find information relevant to the search term. A search index may refer to information that is collected, parsed and stored to help facilitate accurate information retrieval. For instance, the search index may store the title and other metadata related to a particular game or game object (e.g., meta-keywords, description of the game or game object, user comments related to the game, etc.). In one implementation, search engine 140 may use keyword similarity techniques that compare the search term to terms associated with the games in the search index and select the most relevant games (or game object) based on keyword similarity. For example, responsive to finding one or more games that are relevant to the search term, "Tycoon" (e.g., the tile or description contains the word "tycoon" or variation thereof), links to or identifiers of one or more of the relevant games may be sent to client device 110 and displayed.

It may be noted that using keyword similarity techniques may include exact matches, matches that include the search term, matches that include spelling variations of the search term, matches with synonyms of the search term, matches with related terms, matches with related genres, and so forth. It may also be noted that keyword similarity techniques may assign similarity scores (e.g., probability) to search results that indicate a probability that a search result is similar to search term.

In implementations, the client devices 110A through 110B may each include computing devices such as personal computers (PCs), mobile devices (e.g., laptops, mobile phones, smart phones, tablet computers, or netbook computers), network-connected televisions, gaming consoles, etc. In some implementations, client devices 110A through 110B may also be referred to as "user devices." In implementations, one or more client devices 110 via collaboration application 114 may connect to collaboration platform 120 at any given moment.

In implementations, each client device 110 may include an instance of collaboration application 114. In one implementation, the collaboration application 114 may be an application that allows users to use and interact with collaboration platform 120, such as control a virtual character in a virtual game hosted by collaboration platform 120, or view or upload content, such as images, video items, web pages, documents, and so forth. In one example, the collaboration application 114 may be a web browser that can access, retrieve, present, and/or navigate content (e.g., virtual character in a virtual environment, etc.) served by a web server. The collaboration application 114 may render, display, and/or present the content (e.g., a web page, a media viewer) to a user. In an implementation, the collaboration application 114 may also include an embedded media player (e.g., a Flash® player) that is embedded in a web page. In another example, the collaboration application 114 may be a standalone application (e.g., a mobile application, app, or a gaming program) that allows users to interact with collaboration platform 120. According to aspects of the disclosure, the collaboration application 114 may be a collaboration platform application for users to build, create, edit, upload content to the collaboration platform 120 as well as interact with collaboration platform 120. As such, the collaboration applications 114 may be provided to the client devices 110A and 110B by the server 130 or collaboration platform 120. In another example, the collaboration applications 114 may be applications that are downloaded from the server 130.

In implementations, a user may login to collaboration platform 120 via collaboration application 114. The user may access a user account by providing user account information (e.g., user name and password) where the user account is associated with one or more characters available to participate in one or more games 122 of collaboration platform 120.

In general, functions described in one implementation as being performed by the collaboration platform 120 can also be performed on the client devices 110A through 110B, or server 130, in other implementations if appropriate. In addition, the functionality attributed to a particular component can be performed by different or multiple components operating together. The collaboration platform 120 can also be accessed as a service provided to other systems or devices through appropriate application programming interfaces, and thus is not limited to use in websites.

In implementations, collaboration platform 120 may include messaging module 128. In implementations, messaging module 128 may be a system, application, or module that allows users to exchange electronic messages via a communication system, such as network 105. Messaging module 128 may be associated with collaboration application 114 (e.g., module of collaboration application 114 or be a separate application). In implementations, users may interface with messaging module 128 and exchange electronic messages among users of collaboration platform 120. Messaging module 128 may be, for example, an instant messaging application, a text messaging application, an email application, a voice messaging application, a video messaging application, or a combination of multiple applications, among others.

In implementations, messaging module 128 may facilitate the exchange of electronic messages between users. For example, a user may be logged into a messaging application on client device 110A, and another user may be logged into a messaging application on client device 110B. The two users may start a conversation, such as an instant messaging conversation. Messaging module 128 may help facilitate the messaging conversation by sending and receiving the electronic messages between the users of collaboration platform 120.

For the sake of illustration, rather than limitation, search engine 140 is described as implemented on collaboration platform 120. In other implementations, search engine 140 may in part or wholly be implemented on client device 110. In other implementations, search engine 140 may in part or wholly be implemented on server 130. In other implementations, search engine 140 operating on one or more of client device 110, server 130, or collaboration platform 120 may work in conjunction to perform the operations described herein. In implementations, search engine interface module 141 of client devices 110 may be a separate application or part of collaboration application 114 (e.g., add-in). Although implementations of the disclosure are discussed in terms of collaboration platforms, implementations may also be generally applied to any type of social network providing connections between users.

In situations in which the systems discussed here collect personal information about users, or may make use of personal information, the users may be provided with an opportunity to control whether the collaboration platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the collaboration platform 120.

Figure 2:
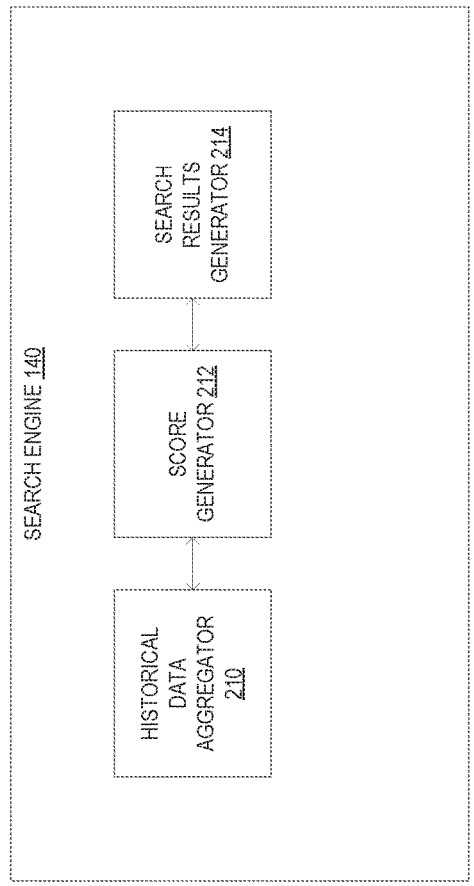
FIG. 2 is an illustration of a search engine, in accordance with implementations of the disclosure.

FIG. 2 is an illustration of a search engine, in accordance with implementations of the disclosure. Elements of FIG. 1 may be used to help illustrate FIG. 2. In some implementations, search engine 140 may include a historical data aggregator 210, score generator 212, or search results generator 214. It may be noted that search engine 140 may include the same, more, or fewer elements.

In some implementations, historical data aggregator 210 has access to historical data related to previous search queries performed by multiple users of collaboration platform 120. The historical data may be stored in data store 106 or other locations from which historical data aggregator 210 may access the historical data. In implementations, historical data aggregator 210 may retrieve raw data and perform one or more operations on the historical data, such as evaluating or comparing raw data to other metrics or thresholds, for example.

In some implementations, historical data aggregator 210 may identify a search term that has been provided by one or more users in previous search queries of the collaboration platform 120 using, for example, search engine interface module 141. It may be noted that information regarding previous search queries (e.g., search terms, search results, user selections from the search results, etc.) may be part of the historical data. For purposed of illustration, rather than limitation, search queries are described as search queries by creating users to search for game objects or search queries by playing users to search for games.

For example, historical data aggregator 210 may identify the search term, "Typhoon" used in search queries for games of the collaboration platform 120. In another example, historical data aggregator 210 may identify the search term, "Vehicle" used in search queries for game objects in a developers interface.

In implementations, historical data aggregator 210 may obtain historical data associated with the search term. In implementations, the historical data may include data (e.g., first data) indicative of a number of times a content item (e.g., game or game object) has been returned in search results responsive to search queries using the search term (e.g., "Typhoon," "Vehicle," etc.).

For example, the historical data may indicate that game A has been returned 100 times in search results for a search query that included the search term, "Typhoon." In another example, the historical data may indicate that game object (e.g., vehicle A) was returned 100 times in search results for a search query that included the search term, "Vehicle."

In some implementations, the historical data obtained by historical data aggregator 210 includes data (e.g., second data) indicative of a number of times a content item was selected by the search results and interacted with by the users for a threshold of time. In some implementations, where the content item is a game of collaboration platform 120, the historical data may be indicative of a number of times the game was selected from the search results and played by users for the threshold amount of time. For example, the historical data may indicate that game A was selected or accessed from search results (e.g., a user interface presenting links or identifiers of games) and the user played game A (e.g., controlled the user's character) for a threshold amount of time (e.g., 9 minutes). In some implementations, determining the user is playing the game may include tracking the time the playing user is controlling a character or tracking the time the user is interacting with a game (e.g., rather than passively having the game open without interaction), for example.

In some implementations, where the content item is a game object of the collaboration platform 120, the historical data (e.g., second data) may be indicative of a number of times the game object was selected from the search results and inserted into a user interface for a threshold amount of time. For example, the historical data may indicate that a game object (e.g., vehicle A) was selected from search results (e.g., responsive to search query using the search term "Vehicle") and placed in a user interface (e.g., game workspace 314 of FIG. 3) for a threshold amount of time (e.g., 1 minute).

In some implementations, the threshold amount of time may be determined based on a relationship between first threshold data indicative of an amount of time one or more games (e.g., data for a specific game or data aggregated for multiple games) is played and second threshold data indicative of a retention level of users having played the one or more games. The retention level may be indicative of probability a user returns to play the same game in another session. For example, the first threshold data and the second threshold data may be plotted as points on an XY graph where X is first threshold data and Y is second threshold data. The threshold amount of time may be chosen by observing a point on the graph where a time a user spends playing a game significantly affects the retention level (e.g., probability a user will return to play the game again). In implementations, the threshold amount of time may be determined in a similar manner for game objects. For example, with regards to game objects, first threshold data may indicate an amount of time a game object is placed in a user interface (e.g., game workspace 314) and second threshold data may indicate a retention level of the game object in the game (e.g., probability that the game object is used in a published game).

In some implementations, the historical data aggregator 210 may filter the historical data to include historical data associated with the search term for a range of days (e.g., for the last N days), for particular users (e.g., experienced users, users of a particular age range, etc.). It may be noted that in some implementations, additional or different historical data may be obtained and used.

In some implementations, search engine 140 includes a score generator 212. Score generator 212 may use the historical data to generate a score for one or more search terms. A score may be associated with the particular search term and particular content item in a search index, for example. In implementations, the score may indicate the relationship or affinity or confidence between a search term and a content item. For example, a higher score may indicate a user is more likely to select (e.g., is more probable to select) a content item that is provided in search results responsive to a search query (e.g., using a particular search term). A lower score may indicate a user is less likely to select a content item that is provided in search results responsive to a search query.

In some implementations, the score may be a confidence interval based on the first data and the second data of the historical data. A confidence interval may be a type of interval estimate that is computed from observed data, such as historical data. In some implementations, the confidence level may be a Wilson score (also referred to as a "Wilson confidence interval" or "Wilson score interval" herein). For example, a confidence interval, such as Wilson Scoring, helps solves a sample size issue. Data with small or large sample sizes may be normalized in a fair manner so it can be scored and compared to other like data sets. For instance, the search term "Tycoon" may be used in a search query to search for games. Responsive to the search query, game A showed up 100 total times as a result of this query. Of the 100 total queries, 50 times the game was clicked, and 25 times the game was played for a minimum of 9 minutes. The results indicate 50 successes, or a 50% success rate. Responsive to the search query, game B showed up 100 total times as a result of the same query. Of the 100 total queries, 2 times game B was clicked and 2 times the game was played for a minimum of 9 minutes. The results indicate 2 successes, or a 100% success rate. If the system were to assign a score to both Game A and Game B for the purpose of rating the games for long term success, it may not be an accurate reflection to indicate that Game B performed better than did A due to the difference in success rate. The 100% success rate in Game B may be misleading because the sample size is too small. A confidence interval, such as Wilson Scoring, may be used to fairly score these games relative to each other.

In some implementations, the historical data may be weighted to influence more of less the score for a search term. In some implementations, the score may be generated based on the weighted historical data. In some implementations, the historical data for a subset of users may be weighted more or less heavily. For example, historical data of experienced users may be weighted more heavily than historical data of non-experienced users. In another example, historical data of logged-in users may be weighted more than historical data than guest users.

It may be noted that a particular game may have one or more associated search terms each with associated scores. It may be noted that a search term associated with different games may have different associated scores. It may be further noted that the scores may be updated as new historical data becomes available. It may also be noted that scores may be generated for one or more search terms.

In implementations, search engine 140 includes a search results generator 214. In implementations, the search results generator 214 may receive a search query from a client device 110 that includes a search term. For example, a user may enter the search term, "Typhoon" into the search engine interface module 141 and submit the search query to collaboration platform 120.

In some implementations, responsive to the receiving the search query, search results generator 214 may determine a first multitude of content items based on first scores (e.g., scores based on historical data) for the search term. Multitude may refer to one or more of something. In implementations, the content items may include games or game objects. The first scores may be generated using historical data associated with the search term, as described above. In implementations, the historical data may be indicative of a number of times a game or game object was selected from previous search results and interacted with by users for a threshold amount of time. It may be noted that the scores for search terms may be described for purposes of illustration, rather than limitation, as scores for particular games (e.g., search term is associated with a score and a particular game).

For example, search results generator 214 may find the same or similar search term, "Typhoon" in the search index. The search term, "Typhoon" may be associated with one or more games. The search term may have different scores for each game. In some implementations, the search results generator 214 may select a threshold number of content items that have the top scores associated with the search term (e.g., "Typhoon"). For example, the search results generator 214 may select 30 games that are associated with "Typhoon" and have the top 30 scores. In other implementations, search results generator 214 may select all the content items where the score for the search term exceeds a threshold score.

In implementations, search results generator 214 determines a second multitude of content items for the search query based on keyword similarity. In some implementations, search results generator 214 may select a threshold number of content items that are similar with the search term (e.g., Typhoon). For example, search results generator 214 may select N number of content items having the top similarity score based on keyword similarity.

In some implementations, the first multitude of content items is absent one or more new games and one or more new game objects. For example, new content items may have little to no historical data and scores for new content items may too low to be included in the first multitude of content items. In some implementations, the second multitude of content items includes one or more new games or one or more new game objects. In implementations, the second multitude of content items includes content items with no or little historical data (e.g., new or recently added content items). It may be noted that including the second multitude of content items in the final search results allows content items with no or little historical data to surface in the search results.

In implementations, search results generator 214 determines the search results by selecting from the first multitude of content items and the second multitude of content items. For example, search results generator 214 may merge the first and second multitude of content items into the search results, randomly select some content items from both the first and second multitude of content items, or rank the content items of the first and second multitudes of content items and select a top N number of ranked content items (as described below). It may be noted that the search results may be determined in numerous ways by selecting from the first and second multitudes of content items.

In some implementations, to determine the search results by selecting from the first multitude of content items and the second multitude of content items the search results generator 214 determines second scores for the second multitude of content items that were selected based on keyword similarity. In some implementations, search results generator 214 may generate a score for the second multitude of content items by determining a score for the search term (e.g., "Typhoon") based on the historical data. For example, for each of the second multitude of content items, search results generator 214 may search the search index for the associated search term, "Typhoon," and the associated score (e.g., similar as described above with respect to score generator 212). In some implementations, for content items of the second multitude of content items that do not have an associated score (e.g., content items without historical data), search results generator 214 may assign a default score. It may be noted that the score for the second multitude of content items based on historical data may be low and non-zero.

In some implementations, search results generator 214 may generate a score for the second multitude of content items by using the similarity scores generated based on the keyword similarity. In some implementations, the similarity scores may be scaled relative to the scores based on historical data. For example, if the scores based on historical data are on a scale from 0 to 1, and the similarity scores are on a scale based from 0 to 10, a similarity score of 9 may be scaled to a 0.9 to conform with the scores based on historical data.

In some implementations, the search results generator 214 generates ranked content items by sampling from the first multitude of content items and the second multitude of content items based on the first scores (e.g., scores based on historical data) and the second scores. In one example, search results generator 214 ranks the first and second multitude of content items from highest to lowest scores.

In some implementations, generating the ranked content items by sampling from the first multitude of content items and the second multitude of content items based on the first scores and the second scores includes ranking the first plurality of content items and the second plurality of items where each of the first multitude of content items and the second multitude of content items have a non-zero probability for a particular rank and a probability for the particular rank that is proportional to the first scores and the second scores. For example, all the content items (first and second multitude) have a non-zero probability to be ranked first. The content item with the highest score has the greatest probability to be ranked first (e.g., 60%), the content item with the second highest score has a lower probability to be ranked first (e.g., 25%), the content item with the eight highest score has an even lower probability to be ranked first (e.g., 7%) and so on. The above sampling may produce a ranked order of content items that allows content items with lower scores to surface to the top of the rankings. Content items from the first and second multitude may be sampled using a variety of techniques, such as Thompson sampling techniques.

In some implementations, search results generator 214 selects top ranking content items from the ranked content items to include in the search results. For example, in some implementations, the search results generator 214 select the top N number of content items based on the rank order.

Figure 3:
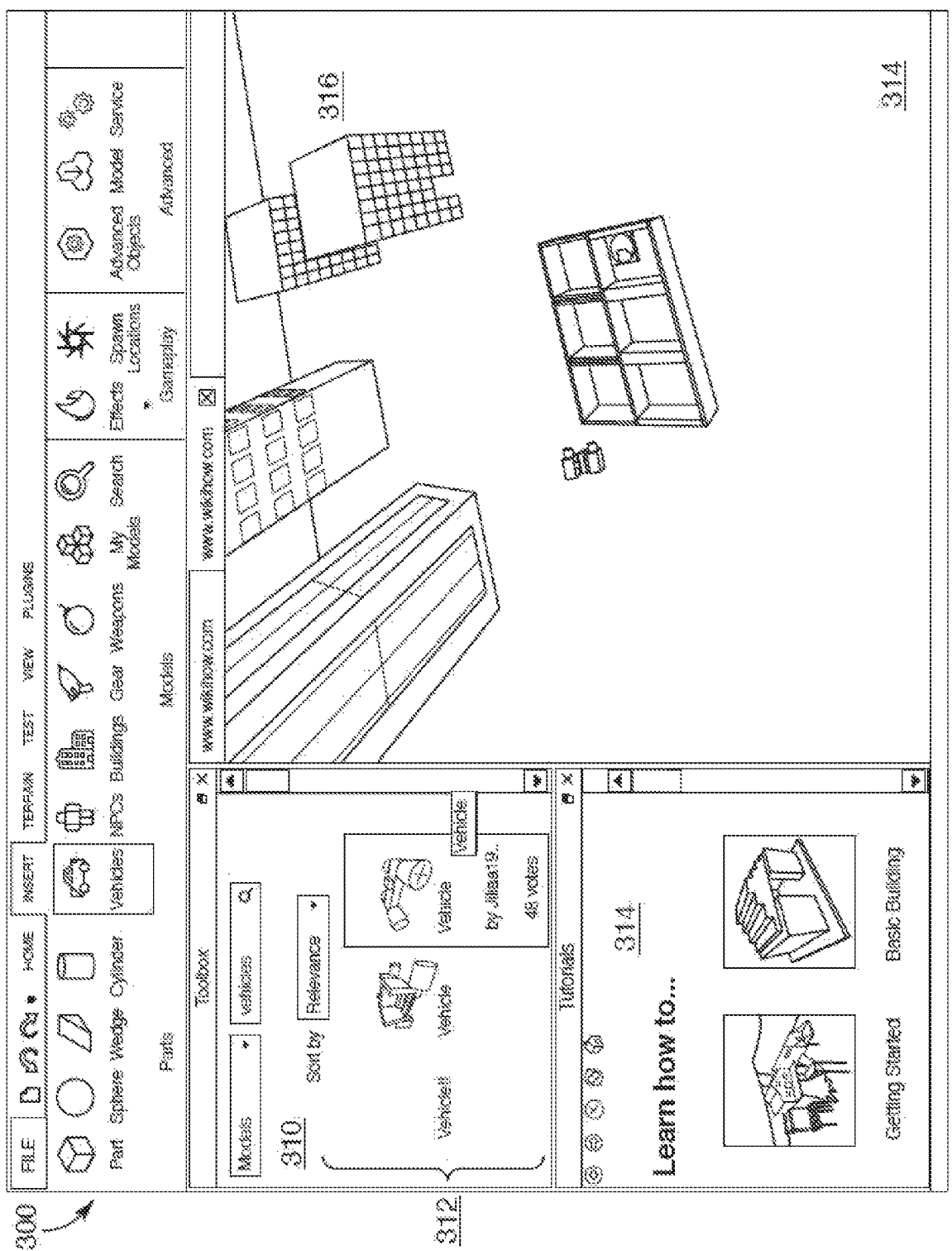
FIG. 3 illustrates a user interface to create and build games on the collaboration platform, in accordance with some implementations of the disclosure.

FIG. 3 illustrates a user interface to create and build games on the collaboration platform, in accordance with some implementations of the disclosure. Elements of FIG. 1 and FIG. 2 may be used to help illustrate FIG. 3. In implementations, user interface 300 may be a developer interface that allows a creating user to access creator module 126 of collaboration platform 120. In implementations, a creating user may use collaboration application 114 of client device 110 to access user interface 300. User interface 300 shows a search engine portal 310 that allows a creating user to search for game objects (e.g., parts and models). In the present example, the creating user submitted a search query to the search engine 140 of collaboration platform 120 using the search term, "vehicles." Search engine 140 may use aspects of the present disclosure to return search results 312 of relevant game objects based on a search term, such as "vehicles."

User interface 300 illustrates the placement or insertion of game objects in a game workspace 314. For example, game object 316 (e.g., building) has been retrieved from the search engine portal 310 and inserted into a game workspace 314. In implementations, collaboration platform 120 may track the amount of time the game object 316 is inserted into the game workspace 314.

Figure 4:
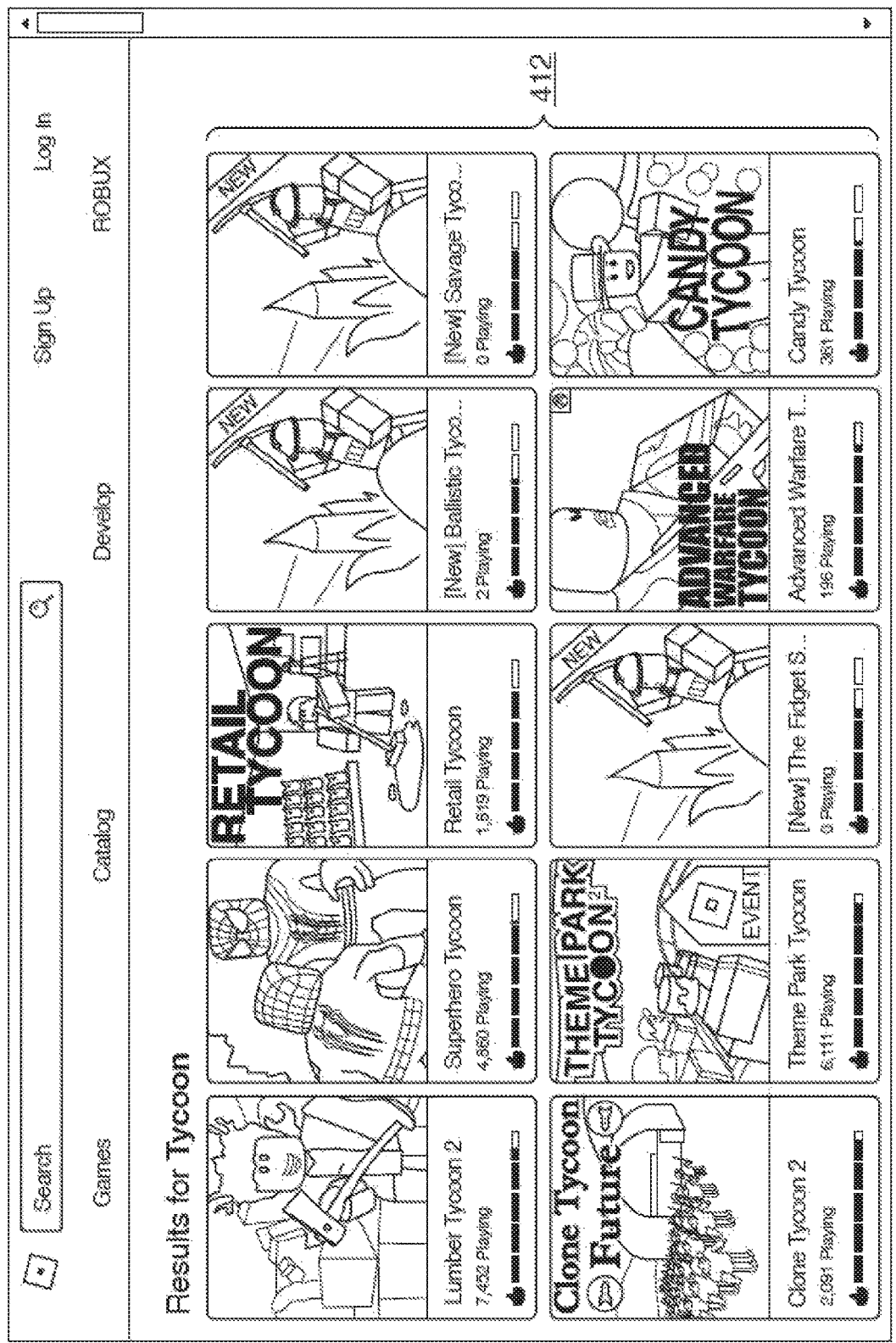
FIG. 4 illustrates a user interface showing search results, in accordance with some implementations of the disclosure.

FIG. 4 illustrates a user interface showing search results, in accordance with some implementations of the disclosure. Elements of FIG. 1-3 may be used to help illustrate FIG. 4. User interface 400 shows the search results 412 for a search query using the search term, "Tycoon." Aspects of the present disclosure may be implemented to provide the search results 412. As illustrated, the search results 412 include identifiers (e.g., images) of the respective games. Both new games and older games are provided in the search results 412. In implementations, a user may select a game (e.g., game identifier) from the search results 412 to access the game from collaboration platform 120. In some implementations, the games (e.g., game identifiers) may be displayed in a ranked order. For example, the games may be displayed top, left to right, bottom, left to right in descending ranking order (e.g., 1 through 10 rank).

Figure 5:
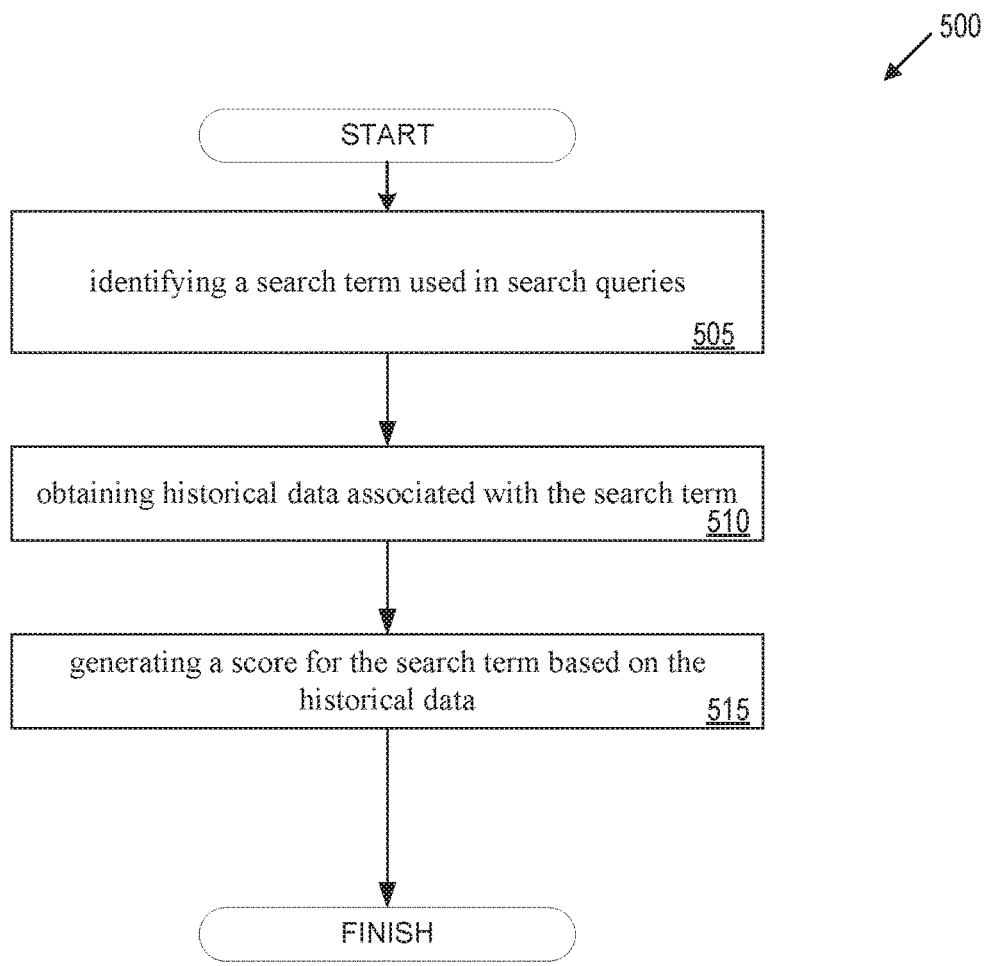
FIG. 5 is a flow diagram illustrating a method for generating scores for search terms, in accordance with some implementations of the disclosure.

FIG. 5 is a flow diagram illustrating method 500 for generating scores for search terms, in accordance with some implementations of the disclosure. Method 500 may be performed by processing logic that includes hardware (e.g., circuitry, dedicated logic, programmable logic, microcode), software (e.g., instructions run on a processing device to perform hardware simulation), or a combination thereof. In some implementations, search engine 140 executing at collaboration platform 120, client device 110A, client device 110B or combination thereof may perform some or all the operations. Components of FIG. 1-4 may be used to help illustrated method 500. It may be appreciated that the in some implementations, method 500 may include the same, different, fewer, or greater operations performed in any order.

Method 500 begins at block 505 where processing logic identifies a search term used in search queries of a collaboration platform 120.

At block 510, processing logic obtains historical data associated with the search term. The historical data includes first data indicative of a number of times a content item has been returned in search results responsive to the search queries using the search term. The historical data includes second data indicative of a number of times the content item was selected from the search results and interacted with by users for a threshold amount of time.

In some implementations, the content item is a game of the collaboration platform and the second data is indicative of the number of times the game was selected from the search results and played by the users for the threshold amount of time. In some implementations, the content item is a game object of the collaboration platform. The second data is indicative of the number of times the game object was selected from the search results and inserted into a user interface for the threshold amount of time.

At block 515, processing logic generates a score for the search term based on the historical data. The score is associated with the search term and the content item in a search index, for example. In some implementations, the score is a confidence interval (e.g., Wilson score) based on the first data and the second data.

Figure 6:
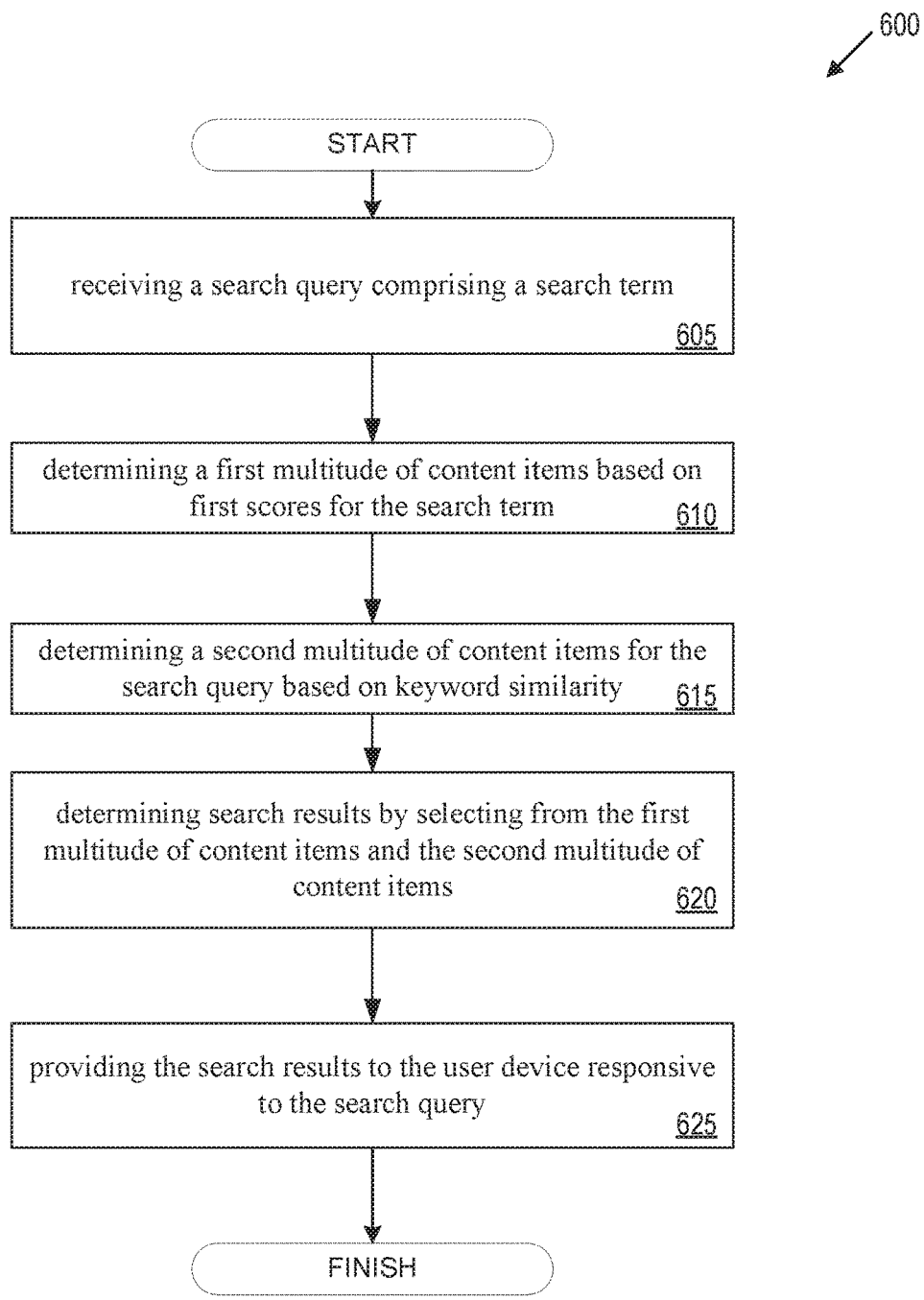
FIG. 6 is a flow diagram illustrating a method for determining search results, in accordance with some implementations of the disclosure.

FIG. 6 is a flow diagram illustrating method 600 for determining search results, in accordance with some implementations of the disclosure. Method 600 may be performed by processing logic that includes hardware (e.g., circuitry, dedicated logic, programmable logic, microcode), software (e.g., instructions run on a processing device to perform hardware simulation), or a combination thereof. In some implementations, search engine 140 executing at collaboration platform 120, client device 110A, client device 110B or combination thereof may perform some or all the operations. Components of FIG. 1-4 may be used to help illustrated method 600. It may be appreciated that the in some implementations, method 600 may include the same, different, fewer, or greater operations performed in any order.

Method 600 begins at block 605 where processing logic receives a search query from a user device. The search query includes a search term. At block 610, processing logic determines a first multitude of content items based on first scores for the search term. In implementations, the first scores are generated using historical data associated with the search term. In implementations, the content item includes a game or game object. In implementations, the historical data is indicative of a number of times the game or the game object was selected from previous search results and interacted with by users for a threshold amount of time.

At block 615, processing logic determines a second multitude of content items for the search query based on keyword similarity. At block 620, processing logic determines search results by selecting from the first multitude of content items and the second multitude of content items. At block 625, processing logic provides the search results to the user device responsive to the search query. In implementations, the search results are presented in ranked order.

Figure 7:
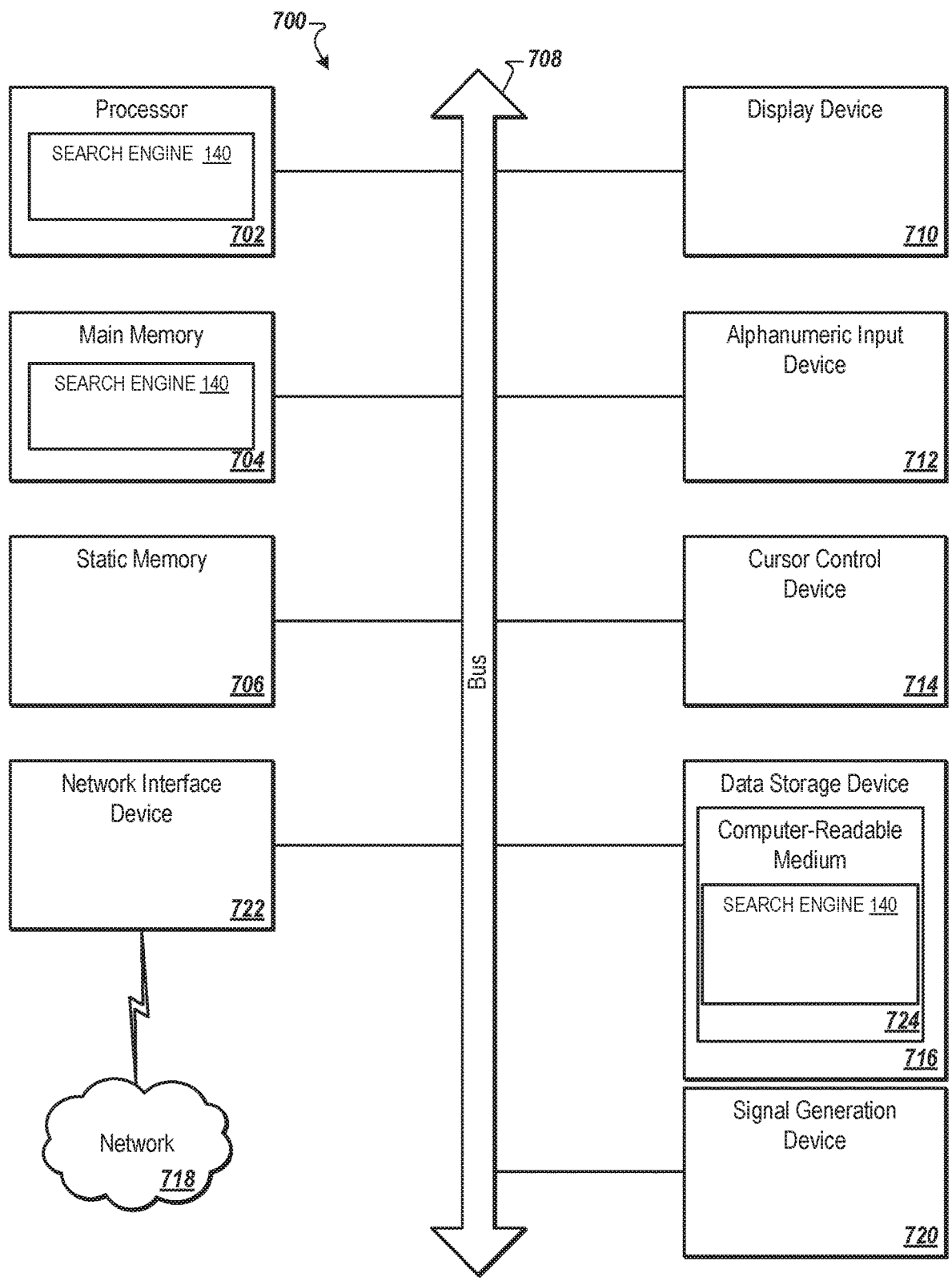
FIG. 7 is a block diagram illustrating an exemplary computer system, in accordance with implementations of the disclosure.

FIG. 7 is a block diagram illustrating an exemplary computer system 700, in accordance with implementations. The computer system 700 executes one or more sets of instructions that cause the machine to perform any one or more of the methodologies discussed herein. Set of instructions, instructions, and the like may refer to instructions that, when executed computer system 700, cause computer system 700 to perform one or more operations of search engine 140. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 716, which communicate with each other via a bus 708.

The processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute instructions of the system architecture 100 and the search engine 140 for performing the operations discussed herein.

The computer system 700 may further include a network interface device 722 that provides communication with other machines over a network 718, such as a local area network (LAN), an intranet, an extranet, or the Internet. The computer system 700 also may include a display device 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 716 may include a non-transitory computer-readable storage medium 724 on which is stored the sets of instructions of the system architecture 100 and search engine 140 embodying any one or more of the methodologies or functions described herein. The sets of instructions of the system architecture 100 and search engine 140 may also reside, completely or at least partially, within the main memory 704 and/or within the processing device 702 during execution thereof by the computer system 700, the main memory 704 and the processing device 702 also constituting computer-readable storage media. The sets of instructions may further be transmitted or received over the network 718 via the network interface device 722.

While the example of the computer-readable storage medium 724 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "detecting," "generating," "determining," "providing," "assembling," "scaling," "providing," "identifying," "associating," or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form.

Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

In additional implementations, one or more processing devices for performing the operations of the above described implementations are disclosed. Additionally, in implementations of the disclosure, a non-transitory computer-readable storage medium stores instructions for performing the operations of the described implementations. Also in other implementations, systems for performing the operations of the described implementations are also disclosed.

What is claimed is:

1. A method comprising:
    identifying a search term;
    obtaining historical data indicative of a number of times that a) a game was selected from search results corresponding to search queries using the search term, and b) the selected game was played by one or more users for at least a threshold amount of time, wherein the selected game was played responsive to being selected from the search results corresponding to the search queries using the search term, wherein the selected game that was played by the one or more users for the threshold amount of time comprises controlling a game object in a game environment for the threshold amount of time; and
    generating a score based on the historical data, wherein the score is associated with the search term and the selected game.

2. The method of claim 1, wherein the selected game that was played by the one or more users for the threshold amount of time comprises controlling the selected game via a user interface for the threshold amount of time.

3. The method of claim 1, wherein the selected game that was played by the one or more users for the threshold amount of time further comprises inserting the game object into the game environment displayed via a user interface, and wherein the controlling of the game object is within the selected game within the game environment displayed via the user interface via user input for the threshold amount of time.

4. The method of claim 1, wherein the threshold amount of time is based on a relationship between an amount of time the selected game is played by a user in a first session and a retention level indicative of a probability of the user subsequently playing the selected game in a subsequent session.

5. The method of claim 1, wherein the search term is submitted in a plurality of search queries submitted by a plurality of users of a collaboration platform, wherein the historical data is associated with the search term being that was used in the plurality of search queries submitted by the plurality of users.

6. The method of claim 1, wherein the historical data is further indicative of a number of times the selected game was returned in the search results responsive to search queries that included the search term.

7. The method of claim 1, further comprising:
receiving, from a user device, a search query comprising the search term; and
providing a plurality of search results that include one or more games comprising the selected game to the user device responsive to the search query.

8. A method comprising:
receiving, from a user device, a search query comprising a search term;
identifying a first plurality of games based on first scores for the search term, wherein at least one of the first scores is generated using historical data indicative of a number of times that a) a game was selected from search results corresponding to previous search queries using the search term, and b) the selected game was played by one or more users for at least a threshold amount of time, wherein the selected game was played responsive to being selected from the search results corresponding to the search queries using the search term, wherein the selected game that was played by the one or more users for the threshold amount of time comprises controlling a game object in a game environment for the threshold amount of time; and
providing one or more of the first plurality of games in search results to the user device responsive to the search query.

9. The method of claim 8, further comprising:
identifying a second plurality of games for the search query, wherein at least one of the second plurality of games is provided in the search results.

10. The method of claim 9, wherein identifying the second plurality of games for the search query comprises comparing the search term to terms associated with games in a search index and selecting relevant games based on keyword similarity associated with the search term.

11. The method of claim 9, wherein the first plurality of games are absent one or more new games for which the historical data is unavailable, and wherein the second plurality of games comprise the one or more new games.

12. The method of claim 9, further comprising:
determining second scores for the second plurality of games;
obtaining a ranking of games by sampling from the first plurality of games and the second plurality of games based on the first scores and the second scores; and
selecting one or more games from the ranking of the games for inclusion in the search results.

13. The method of claim 8, wherein the selected game that was played by the one or more users for the threshold amount of time comprises one or more of: controlling the selected game via a user interface for the threshold amount of time; or controlling the game object within the selected game via user input for the threshold amount of time.

14. The method of claim 8, wherein the threshold amount of time is based on a relationship between an amount of time the selected game is played by a user in a first session and a retention level indicative of a probability of the user subsequently playing the selected game in a subsequent session.

15. An online gaming system comprising:
a memory; and
a processing device, coupled to the memory, to:
identify a search term;
obtain historical data indicative of a number of times that a) a game was selected from search results corresponding to search queries using the search term, and b) the selected game was played by one or more users for at least a threshold amount of time, wherein the selected game was played responsive to being selected from the search results corresponding to the search queries using the search term, wherein the selected game that was played by the one or more users for the threshold amount of time comprises controlling a game object in a game environment for the threshold amount of time; and
generate a score based on the historical data, wherein the score is associated with the search term and the selected game.

16. The online gaming system of claim 15, wherein the selected game that was played by the one or more users for the threshold amount of time comprises the selected game that was controlled via a user interface for the threshold amount of time.

17. The online gaming system of claim 15, wherein the selected game that was played by the one or more users for the threshold amount of time comprises the game object within the selected game that was controlled via user input for the threshold amount of time.

18. The online gaming system of claim 15, wherein the threshold amount of time is based on a relationship between an amount of time the selected game is played by a user in a first session and a retention level indicative of a probability of the user subsequently playing the selected game in a subsequent session.

19. The online gaming system of claim 15, wherein the search term is submitted in a plurality of search queries submitted by a plurality of users of a collaboration platform, wherein the historical data is associated with the search term that was used in the plurality of search queries submitted by the plurality of users.

20. The online gaming system of claim 15, wherein the processing device is further to:
receive, from a user device, a search query comprising the search term; and
provide a plurality of search results that include one or more games comprising the selected game to the user device responsive to the search query.

* * * * *